No. 726,742. PATENTED APR. 28, 1903.
E. PASSBURG.
VACUUM PAN.
APPLICATION FILED FEB. 4, 1903.
NO MODEL.
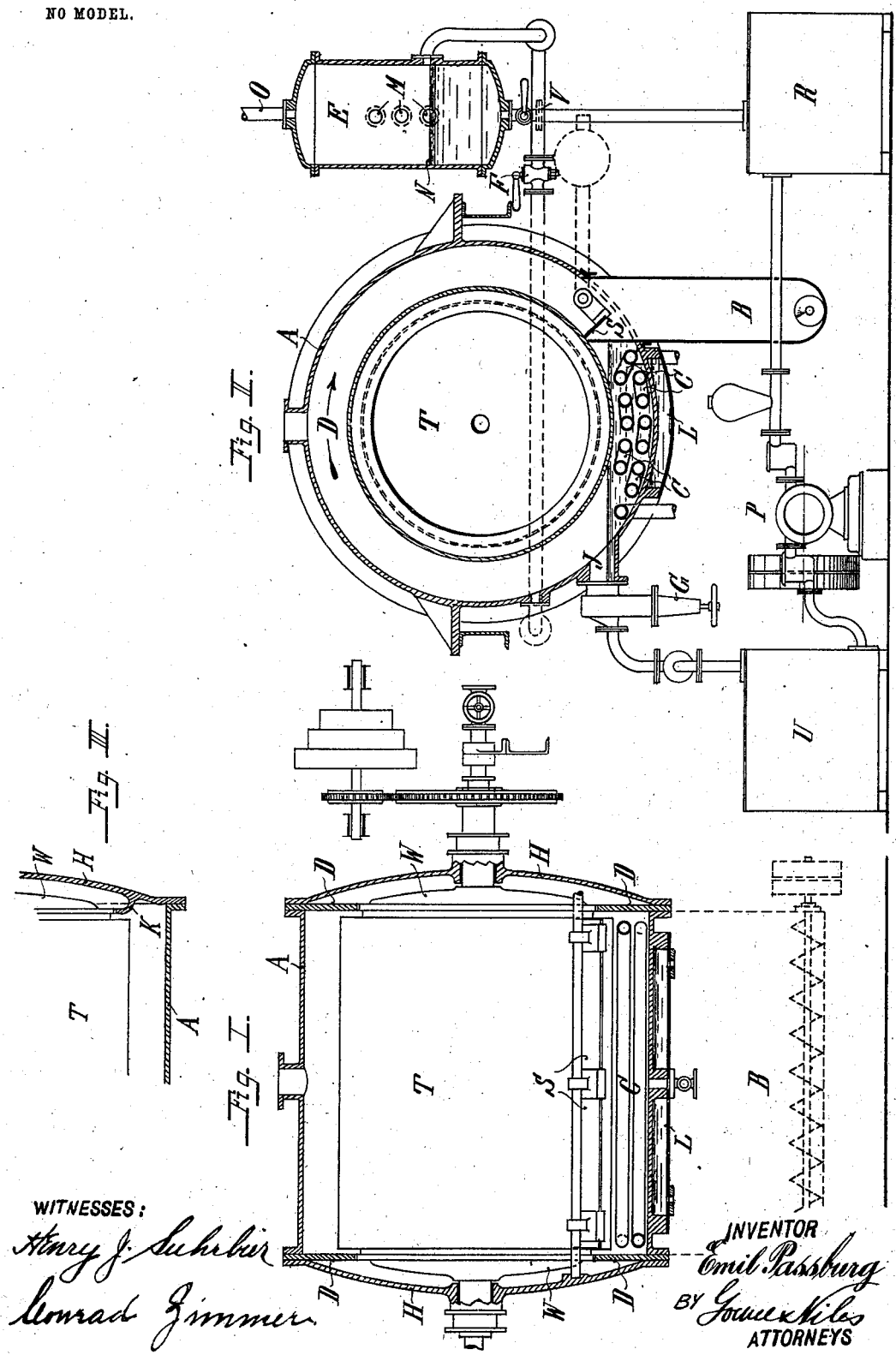
WITNESSES:
INVENTOR
Emil Passburg
BY
ATTORNEYS

UNITED STATES PATENT OFFICE.

EMIL PASSBURG, OF BERLIN, GERMANY.

VACUUM-PAN.

SPECIFICATION forming part of Letters Patent No. 726,742, dated April 28, 1903.

Application filed February 4, 1903. Serial No. 141,815. (No model.)

*To all whom it may concern:*

Be it known that I, EMIL PASSBURG, a subject of the German Emperor, and a resident of Berlin, Germany, have invented a certain new and useful Apparatus for Drying Aqueous and Alcoholic Solutions in Vacuo, of which the following is a specification.

This invention relates to apparatus for drying aqueous and alcoholic solutions *in vacuo*.
The evaporation of aqueous or alcoholic solutions—such as glue, gum, tannin, dye-wood, and other liquids—until dryness is reached was hitherto mostly accomplished by two operations. The solutions were first evaporated in open pans under atmospheric pressure or in vacuum-pans to as high a degree of concentration as possible, the said pans being fitted with steam-jackets or steam-coils, or heated by fire-gases or the like. The concentrated solution obtained by the above process with a degree of dryness varying, say, from thirty to seventy-five per cent. was spread on trays and dried to a hard substance in vacuum-chambers or in other drying apparatus provided with heating devices.

After being dried the product had to be ground to a fine powder in order to obtain a uniform marketable material. This process consequently requires special large evaporating and drying apparatus, and also a proportionately large outlay for plant and the like, large space for erecting the plant and a considerable amount of labor for charging the trays with wet material and emptying the dry material from them. It was also impossible with this drying process to prevent the liquid from coming into contact for a considerable length of time with the heating-surfaces of the evaporating and drying apparatus, and this caused many substances which were sensitive to heat to suffer in quality.

There are already in existence rotary drying-drums for drying solutions *in vacuo* or under atmospheric pressure without previously evaporating the solutions to a certain consistency in other apparatus; but these driers have never been generally adopted. The drawback connected with these rotary drums are that when they are working under atmospheric pressure the substance becomes overheated, or that if they are working with vacuum an equally-dried product is produced partly overheated and partly insufficiently dried. This unequal drying in the rotary vacuum-drums referred to is caused by the impossibility of producing a uniform layer of liquid on the rotary drum either by pouring the liquid onto the drum or by dipping the latter into the former. It has not only been found impossible to adjust the level of the liquid in proportion to its decrease through evaporation, but also to prevent the active boiling, frothing, or ebullition of many liquids on coming into contact with the heated drum *in vacuo*. This caused unequal layers of liquid to be deposited on the drum, so that the drying was not uniformly done, since a thin layer of liquid naturally required less time to dry than a thick layer.

By the use of the apparatus hereinafter described all the drawbacks referred to are avoided and a dry product of perfect equality is obtained in a short time by means of a comparatively low temperature.

In the new apparatus the aqueous or alcoholic solution is drawn automatically into a vacuum vessel in which a drum, heated by a steam or any other means, is adapted to revolve and to dip to a regulatable depth into the liquid. The uniform layer or film of solution which adheres to the surface of the rotary drum is automatically removed by a scraper, and drops into a receiver, which may be emptied periodically with or without destroying the vacuum.

In many cases the evaporating-pans otherwise generally used can be dispensed with altogether, or in any case these pans can be of very much smaller dimensions, since the vacuum drying-drum, which will be hereinafter described, dries even very aqueous solutions during one revolution. For certain reasons this result is unattainable by means of known vacuum drying-chambers or other apparatus for a like purpose.

The improved vacuum apparatus is shown in the annexed drawings.

Figure 1 is a longitudinal section, and Fig. 2 a cross-section thereof. Fig. 3 is a sectional detail view.

The apparatus comprises, essentially, an air-tight casing A, in which a rotary drum T revolves. The drum T dips into the liquid contained at the bottom of the casing A, so that its surface becomes coated with a film or layer of the solution. To secure a uniform layer of liquid on the drum, an overflow-aperture J is provided in the casing A with a slide-valve or adjustable tube G. By adjusting this valve or the like G the level of the liquid to be heated in the casing A can be regulated, so that by raising and lowering the said level the drum T can be immersed in the liquid to a greater or less extent and the thickness of the layer and film on the drum can thus be increased or reduced. The level of the liquid in the casing A being under control, the thickness of the required film or layer will be regulated according to the capacity of the solution to adhere to the surface of the drum in such a manner that the product will be perfectly dry, when after one revolution of the drum the scraper S comes into action and removes the dried residue of the solution from the drum, the conditions being so arranged as to obtain the greatest possible efficiency of the drier.

Besides the means described above for obtaining the desired degree of dryness of the solution speed-pulleys are provided for the purpose of regulating the speed of revolution of the drum. The dried substance drops into an evacuated receiver B, arranged under the vacuum-casing A, the said receiver being emptied in any suitable known manner. This receiver B may also be heated in order to effect, if necessary, a final drying of the product. The solution is sucked into the apparatus from the tank R by a vacuum created in A, or the liquid may enter the apparatus by gravity, the supply being regulated by means of a cock F. After the liquid-level has been regulated by means of the valve G the excess of liquid—that is to say, that quantity which is not removed by the drum T—flows into an overflow vessel U, and from the latter a pump P forces the solution back into the tank R.

With a little practice an attendant will easily be able to regulate the inlet-cock F in such a manner that the supply of solution is completely removed by the rotary drum and dried thereon.

Observation-apertures are provided in the casing A to permit of exactly ascertaining the level of the liquid. The overflow-aperture J also serves as a safety device in case, through inattention or neglect on the part of the attendant, the supply of solution should exceed the level determined by the regulating slide-valve or adjustable pipe G, thus allowing the surplus to run off through J. By means of this contrivance a continuous supply of solution to be dried is secured, and consequently also an even and steady working, and the overflow of liquid into the product already dried is prevented.

It is of great importance to allow only the circumference of the rotary drum T and not the end plates W W to come into contact with the liquid and also to prevent the liquid from entering the space between the end plates W W of the drum T and the walls H H of the air-tight casing A. Solution entering this space would adhere to the end plates of the drum and the walls of the casing A and dry thereon, would become overheated, and fill up this said space, thus preventing the easy running of the drum. In order to prevent this occurrence, separate spacers are divided off in the casing A by means of annular disks D D, which fit closely to the edges of the end plates W W, and thus prevent the solution from entering the said spaces. The partitioning off of the end sections of the casing A may of course also be carried out in any other suitable manner. Another arrangement for the same purpose is shown by Fig. 3. In this case the ends H H of the casing A have circular flanges K K cast on them or otherwise fixed. Into these flanges the end plates W W of the drum T fit in such a manner as to be adapted to rotate, but to form sufficiently-tight joints to prevent the liquid entering the spaces between the walls H H and W W.

The vacuum drying apparatus constructed in the manner described does not, however, answer all requirements to insure steady uninterrupted working, if solutions are to be dried which produce a large amount of froth when boiling *in vacuo*, as is mostly the case with solutions of glue, tannin, albumen, and the like. This ebullition and frothing of some solutions are caused in some cases by the fact that the liquid in the casing A receiving heat from the heated drum T begins to boil and to produce froth, so that it rises above its normal level and covers a larger extent of the drum's surface than was intended. The result is that the layer produced on the drum is in some places too thick and in others too thin.

In other cases the solution enters the apparatus at a temperature above its boiling-point *in vacuo* and the excess of heat causes an immediate ebullition and frothing of the liquid in the apparatus when under the influence of the vacuum in the latter. In order to prevent this excessive frothing and obtain a uniform drying even with solutions of a frothy nature, a further and most important condition is required, which will insure a dry product of perfect quality and an uninterrupted economical working of the apparatus. For this purpose cooling-pipes C C or other cooling surfaces or bodies are provided in the casing A below the level of the liquid, as shown in Fig. 1, or an external cooling-jacket L is placed around the casing A. Cold water or some other heat-absorbing substance circulates through these cooling-bodies, and after being heated by contact with the heated drum T the liquid to be dried is again cooled sufficiently to prevent its frothing and the resulting detrimental effect on the drying capacity of the rotary drum. Owing to this cooling arrangement and the consequent low temperature of the liquid, the whole drying-surface of the drum T becomes uniformly coated with the solution and produces a product or powder of uniform dryness.

In order to prevent the frothing and ebullition of solution heated to a high temperature before entering the casing A, Figs. 1 and 2, an auxiliary vessel E can be provided with observation-apertures M M, by means of which the level of the liquid can be ascertained. This vessel E, which is under vacuum approximately equal to that in the casing A, is also connected with the condenser and air-pump (not shown) by a pipe O, is filled, for example, with the overheated liquid up to mark N by means of the cock V or the supply-pipe, and liquid is thereupon drawn into the vessel E from the tank R by means of the vacuum in said vessel E. If the temperature of the liquid is, say, 50° centigrade and the pressure in vessels A and E is such that water will boil therein at 35° centigrade the surplus heat contained in the solution will cause the latter to boil on entering E until the said surplus heat has been spent. The frothing caused through this boiling in vessel E does not interfere detrimentally with the working of the drying-drum T in vessel A. By the evaporation which takes place in vessel E the temperature of the solution is reduced to the boiling-point corresponding to the vacuum, in this case 35° centigrade, and after this temperature has been reached the frothing will of course cease. After this equalizing of temperature has taken place the solution may enter the casing A through the cock F and though the liquid will again be heated by coming into contact with the heated drum it is again cooled by the cooling-pipes C C or cooling-jacket L, by which means a uniform layer or film of liquid on the drum T and a uniform drying is attained. The inlet-cocks V and F may be regulated to cause a continuous and automatic supply of solution from the tank R to the auxiliary vessel E and from there to the casing A. The cooling of the solution before it enters the casing A to prevent it frothing may of course also be effected by means of cooling pipes or coils under atmospheric pressure; but in this case the surplus heat contained in the solution will not be utilized for evaporation, as is the case within the auxiliary vessel E. For this purpose the latter is fitted with a vapor-outlet O, by which the vapors escape to the condenser. Should the temperature of the solution correspond with the boiling-point of the liquid in the vacuum created in vessel E, the auxiliary vessel may be dispensed with. If a vacuum-pan is to be used for evaporating the solution down to a certain consistency, the vessel E may be utilized as a vacuum-pan for this purpose.

I declare that what I claim is—

1. A vacuum drying apparatus comprising a vacuum-chamber adapted to contain the solution to be dried, a heated drying-drum adapted to rotate therein and extending into the solution to receive a coating of the latter, means for removing the dried product from the surface of the drum, a receptacle in communication with said chamber for receiving said dried product, means for regulating the level of solution in said vacuum-chamber and means for preventing the overflow of the solution into the receptacle containing the dried product substantially as described.

2. A vacuum drying apparatus comprising a vacuum-chamber adapted to contain the solution to be dried, a heated drying-drum adapted to rotate therein and extending into the solution to receive a coating of the latter, means for removing the dried product from the surface of the drum, a receptacle in communication with said chamber for receiving said dried product, means for regulating the level of solution in said vacuum-chamber, means for preventing the overflow of the solution into the receptacle containing the dried product and means for preventing the solution in the vacuum-chamber from entering the spaces between the end plates of the drum and end walls of said chamber substantially as described.

3. A vacuum drying apparatus comprising a vacuum-chamber adapted to contain the solution to be dried, a heated drying-drum adapted to rotate therein and extending into the solution to receive a coating of the latter, means for removing the dried product from the surface of the drum, a receptacle in communication with said chamber for receiving said dried product, means for regulating the level of solution in said vacuum-chamber means for preventing the overflow of the solution into the receptacle containing the dried product means for preventing the solution in the vacuum-chamber from entering the spaces between the end plates of the drum and end walls of said chamber and means for cooling the solution to prevent boiling or frothing thereof substantially as described.

4. A vacuum drying apparatus comprising a vacuum-chamber adapted to contain the solution to be dried, a heated drying-drum adapted to rotate therein and extending into the solution to receive a coating of the latter means for removing the dried product from the surface of the drum, a receptacle in communication with said chamber for receiving said dried product, means for regulating the level of solution in said vacuum-chamber means for preventing the overflow of the solution into the receptacle containing the dried product, means for preventing the solution in the vacuum-chamber from entering the spaces between the end plates of the drum and the end walls of said chamber, means for cooling the solution to prevent boiling or frothing thereof and means for reducing the temperature of the solution to the boiling-point corresponding to the vacuum in the vacuum-chamber before entering the latter substantially as described.

In witness whereof I have signed this specification in the presence of two witnesses.

EMIL PASSBURG.

Witnesses:
 HENRY HASPER,
 WOLDEMAR HAUPT.